(12) United States Patent
Dicke et al.

(10) Patent No.: US 6,293,608 B1
(45) Date of Patent: Sep. 25, 2001

(54) SELF-ADJUSTING TONNEAU COVER ASSEMBLY

(75) Inventors: Terry D. Dicke; Kwang Yol Kim, both of Elkhart, IN (US)

(73) Assignee: Penda Corporation, Portage, WI (US)

( * ) Notice: Subject to any disclaimer, the term of this patent is extended or adjusted under 35 U.S.C. 154(b) by 0 days.

(21) Appl. No.: 09/556,652

(22) Filed: Apr. 24, 2000

(51) Int. Cl.[7] ........................................ B60P 7/04
(52) U.S. Cl. ............................ 296/100.15; 296/100.17; 296/100.18
(58) Field of Search .................. 296/100.12, 100.15, 296/100.18, 100.16, 100.17; 160/378, 381, 374.1

(56) References Cited

U.S. PATENT DOCUMENTS

| | | |
|---|---|---|
| 1,653,184 | 12/1927 | Kolumbus . |
| 3,477,574 | 11/1969 | Malfroy . |
| 3,482,343 | 12/1969 | Hamu . |
| 3,601,912 | 8/1971 | Dubbs . |
| 3,914,887 | 10/1975 | Newman . |
| 3,949,500 | 4/1976 | Connors . |
| 3,950,869 | 4/1976 | Samarin . |
| 4,144,660 | 3/1979 | Lamb . |
| 4,301,853 | 11/1981 | Vidal . |
| 4,430,814 | 2/1984 | Wulc . |
| 4,430,815 | 2/1984 | Wulc . |
| 4,452,138 | 6/1984 | Bubley et al. . |
| 4,462,186 | 7/1984 | Fuller . |
| 4,525,909 | 7/1985 | Newman . |
| 4,539,734 | 9/1985 | Messerschmitt . |
| 4,635,700 | 1/1987 | Berger . |
| 4,730,866 | 3/1988 | Nett . |
| 4,838,602 | 6/1989 | Nett . |
| 4,860,467 | 8/1989 | Larson . |
| 4,923,240 | 5/1990 | Swanson . |
| 5,058,652 | 10/1991 | Wheatley et al. . |
| 5,076,162 | 12/1991 | Goin . |
| 5,076,338 | 12/1991 | Schmeichel et al. . |
| 5,113,611 | 5/1992 | Rosson . |
| 5,136,797 | 8/1992 | Hildebrandt . |
| 5,152,574 | 10/1992 | Tucker . |
| 5,251,951 | 10/1993 | Wheatley . |
| 5,263,761 | 11/1993 | Hathaway et al. . |
| 5,271,171 | 12/1993 | Smith . |
| 5,472,256 | 12/1995 | Tucker . |
| 5,511,843 | 4/1996 | Isler et al. . |
| 5,522,635 | 6/1996 | Downey . |
| 5,526,866 | 6/1996 | Flentge . |
| 5,540,475 | 7/1996 | Kersting et al. . |
| 5,595,417 | 1/1997 | Thoman et al. . |
| 5,636,893 | 6/1997 | Wheatley et al. . |
| 5,653,491 | 8/1997 | Steffens et al. . |
| 5,688,017 | 11/1997 | Bennett . |
| 5,788,315 | 8/1998 | Tucker . |
| 5,795,011 | 8/1998 | Flentge . |
| 5,906,407 | 5/1999 | Schmeichel . |
| 5,934,735 | 8/1999 | Wheatley . |
| 5,984,400 * | 11/1999 | Miller et al. ................... 296/100.15 |

* cited by examiner

Primary Examiner—D. Glenn Dayoan
Assistant Examiner—Jason Morrow
(74) Attorney, Agent, or Firm—Harness, Dickey & Pierce, PLC

(57) ABSTRACT

An assembly is provided including a front rail, a rear rail, a pair of side rails and a plurality of corner pieces. A pair of self-adjusting devices interconnect the two side rails and the rear rail. Each self-adjusting device includes a stop coupled to a side rail, a biasing device disposed between the stop and a corner piece, and an interconnecting plate fixedly coupled to the side rail and slidably coupled to the corner piece for accommodating relative movement therebetween. According to one aspect of the present invention, the interconnecting plate is coupled to the stop. According to another aspect of the present invention, the biasing device is a coil spring. According to still another aspect of the present invention, the interconnecting plate includes a slot for accommodating sliding movement of a fastener passing through the interconnecting plate and coupling the interconnecting plate to the corner piece.

18 Claims, 3 Drawing Sheets

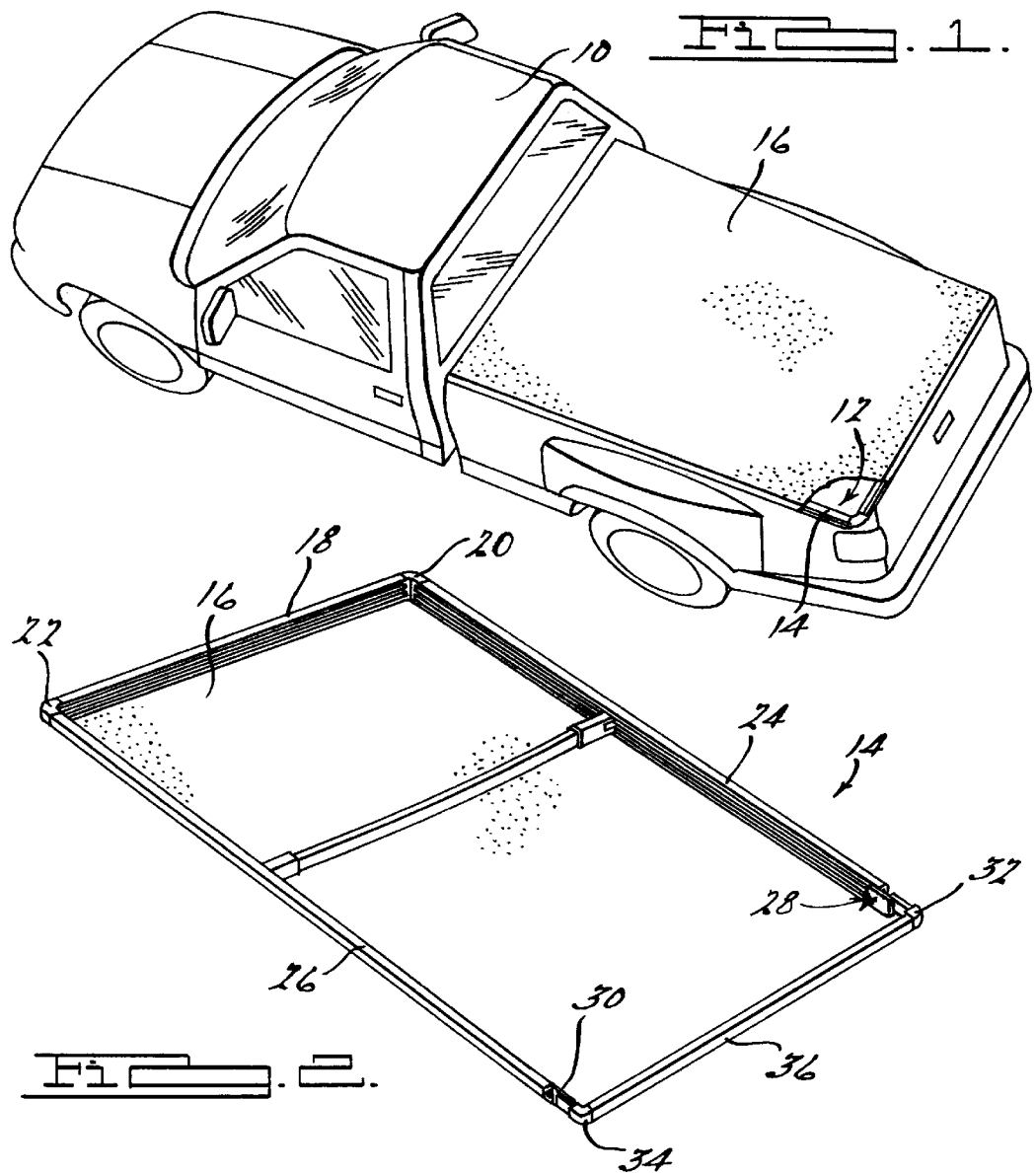
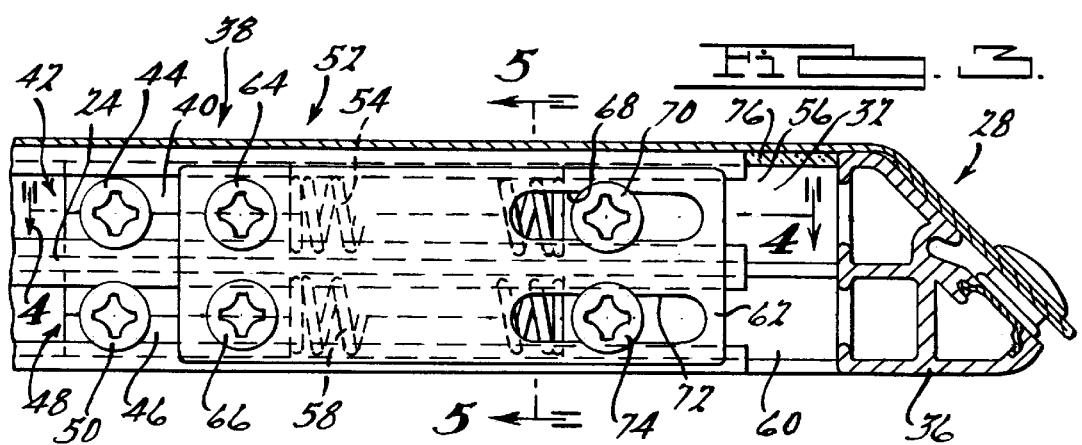

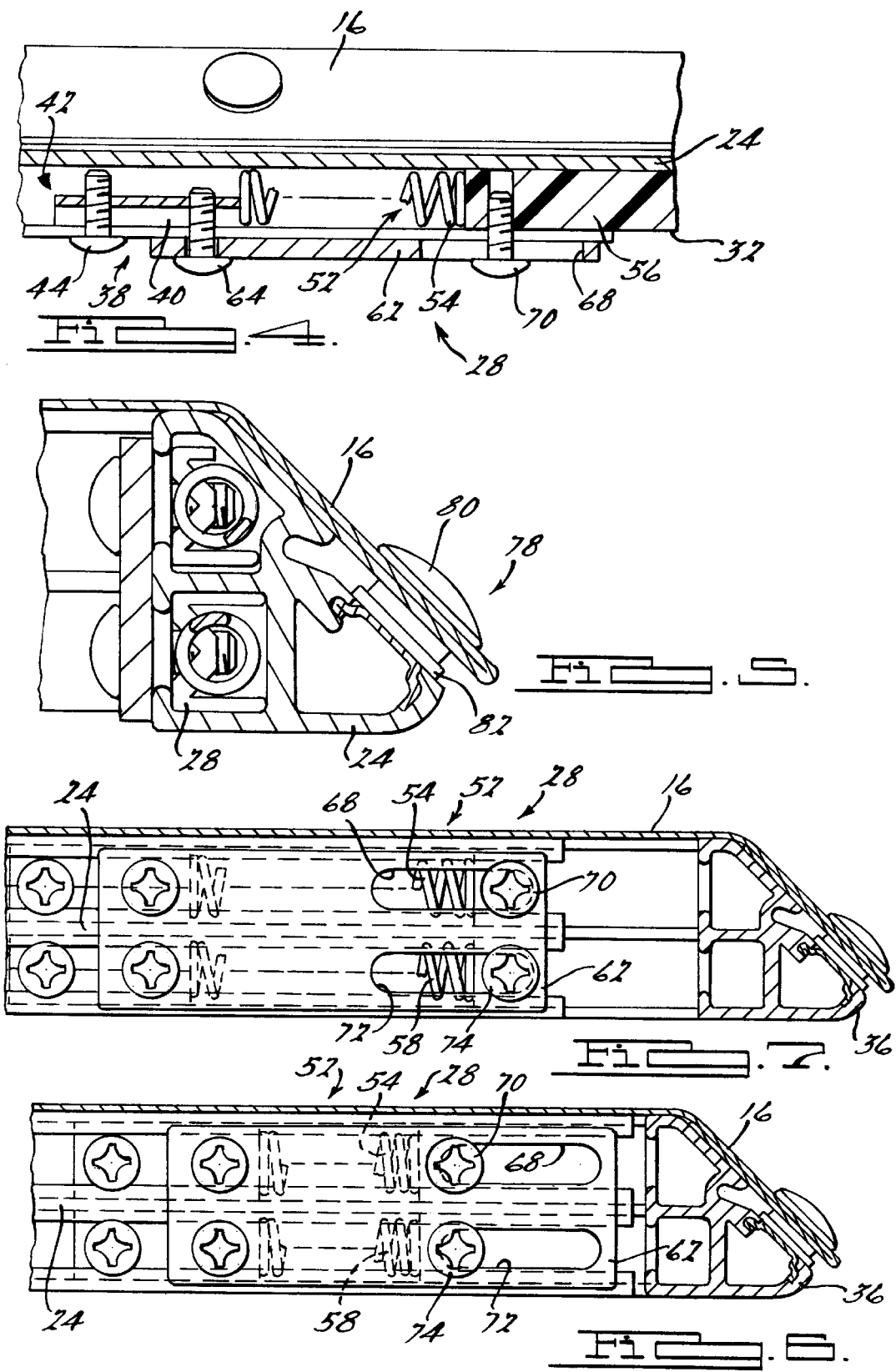

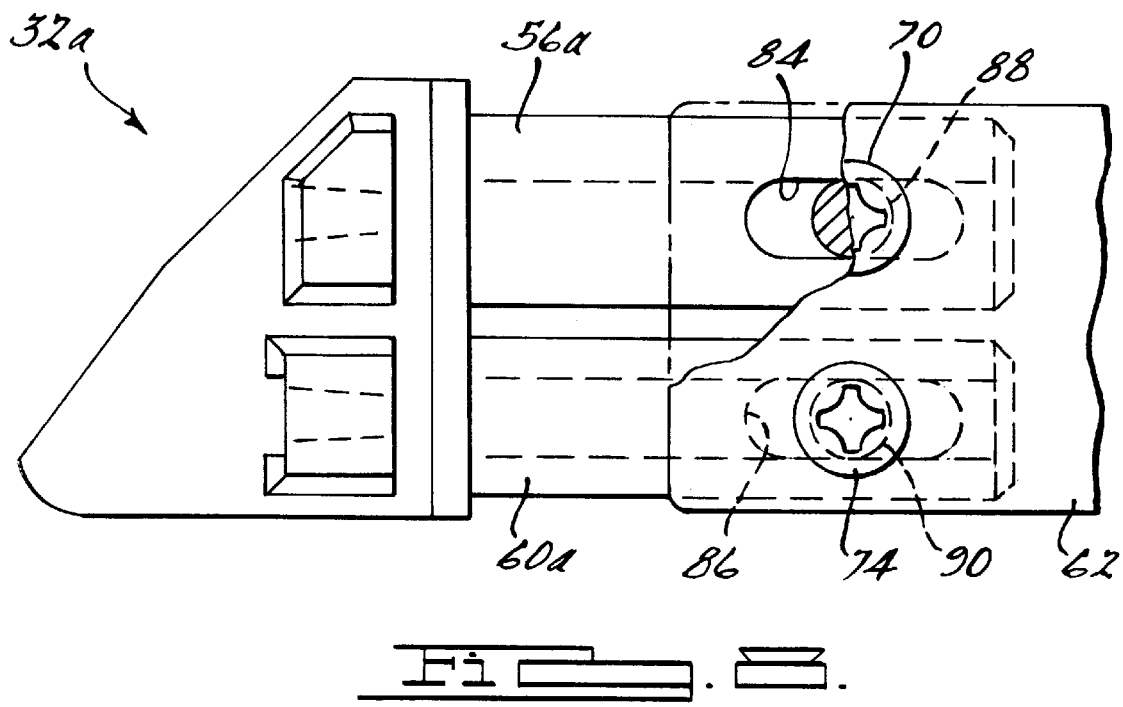

SELF-ADJUSTING TONNEAU COVER ASSEMBLY

BACKGROUND OF THE INVENTION

1. Technical Field

The present invention generally relates to tonneau cover assemblies for the cargo areas of automotive vehicles and, more particularly, to a tonneau cover assembly having a self-adjusting adjusting mechanism for accommodating dimensional changes of a tonneau cover due to temperature variations.

2. Discussion

Many modern automotive vehicles are provided with an open cargo storage compartment for storing and transporting bulky goods. One such cargo storage compartment is the bed portion of a pickup truck. In order to protect the goods within the pickup truck bed from exposure or damage from the elements, and to improve wind resistance and thus fuel economy, many pickup truck beds are covered with tonneau cover assemblies.

Typical tonneau cover assemblies include a frame consisting of a plurality of rails mounted to the top of the pickup truck bed walls. A fabric cover is then removably mounted to the frame assembly rails so as to cover the open portion of the bed. While such assemblies generally function very well, there are some drawbacks to conventional assemblies.

For example, the fabric covers commonly employed in such conventional tonneau cover assemblies have a tendency to shrink and expand with ambient temperature variations. At room temperature, for example 68–72° Fahrenheit, the tonneau cover snaps onto the frame assembly rails with minimal effort and yields a taut cover. However, tonneau covers commonly shrink when ambient temperatures decrease. The shrinking cover tends to pull up from the corners of the assembly. Even more detrimental, it is sometimes extremely difficult to pull the cover into the proper position for snapping it onto the frame assembly after the cover has been removed from the frame assembly and then experiences shrinkage due to temperature drop. Further, the tonneau cover may expand when it is exposed to high ambient temperatures. This tends to wrinkle the cover which may lead to flapping during transportation.

A few prior art approaches have been proposed for accommodating the dimensional variations of tonneau covers due to temperature changes. One approach includes the provision of spacers between the frame rails. By taking the rails apart, inserting a spacer, and reconnecting the rails, a larger frame rail assembly is provided. However, such spacers are extremely burdensome and are commonly unused. Further, such spacers do not accommodate cover shrinkage.

Another approach includes the provision of snap corners between the assembly rails. Each snap corner includes a tab that may be extended from a stowed position to provide an extended anchoring site for the cover. Unfortunately, such tabs are often unused and are prone to breakage. Further, such tabs do not accommodate cover shrinkage.

Yet another approach is to provide a ratcheting mechanism for moving the rails of the assembly relative to one another. To move the rails relative to one another, the ratcheting mechanism is manually adjusted. This forces the rails apart or draws then nearer. However, such manual ratcheting mechanisms commonly go unused and are prone to malfunction. Further, such ratcheting mechanisms are difficult to operate and often require separate tools.

In view of the foregoing, it would be desirable to provide a automatic mechanism for adjusting a tonneau cover frame assembly to accommodate dimensional changes of a tonneau cover due to temperature variations.

SUMMARY OF THE INVENTION

The above and other objects are provided by an assembly including a front rail, a rear ail, a pair of side rails and a plurality of corner pieces. A pair of self-adjusting devices interconnect the two side rails and the rear rail. Each self-adjusting device includes a stop coupled to a side rail, a biasing device disposed between the stop and a corner piece, and an interconnecting plate fixedly coupled to the side rail and slidably coupled to the corner piece. The slidable coupling accommodates relative movement between the rear and side rails. According to one aspect of the present invention, the interconnecting plate is coupled to the stop. According to another aspect of the present invention, the biasing device is a coil spring. According to still another aspect of the present invention, the interconnecting plate includes a slot for accommodating the sliding movement of a fastener passing through the interconnecting plate and coupling the interconnecting plate to the corner piece.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which:

FIG. 1 is a perspective view of an automotive vehicle including a tonneau cover assembly incorporating the teachings of the present invention;

FIG. 2 is a bottom perspective view of the tonneau cover assembly of FIG. 1;

FIG. 3 is a side elevational view in partial cross-section taken along line 3—3 of FIG. 2;

FIG. 4 is a top elevational view in partial cross-section taken along line 4—4 of FIG. 3;

FIG. 5 is a cross-sectional view taken along line 5—5 of FIG. 2;

FIG. 6 is a side elevational view in partial cross-section showing the self-adjusting mechanism of the present invention in a compressed mode;

FIG. 7 is a side elevational view in partial cross-section showing the self-adjusting mechanism of the present invention in an expanded mode; and FIG. 8 is a side elevational view of an alternate embodiment corner piece for the selfadjusting mechanism of the present invention.

DETAILED DESCRIPTION OF THE PREFERRED EMBODIMENTS

The present invention is directed towards a self-adjusting mechanism for interconnecting the side and rear rails of a tonneau cover assembly for an automotive vehicle. The self-adjusting mechanism includes a biasing device in the form of a coil spring for maintaining tension on the tonneau cover as it expands with increasing temperatures and for enabling the rear rail to move towards the side rails as the cover shrinks due to temperature decreases. Advantageously, the self-adjusting mechanism does not require manual adjustment thereby eliminating the potential for damage through misuse and increasing reliability.

Turning now to the drawing figures, FIG. 1 illustrates an automotive vehicle 10 in the form of a pickup truck. The vehicle 10 includes a cargo storage compartment or bed generally indicated at 12. The top of the cargo storage compartment 12 is enclosed by a tonneau cover assembly 14. The tonneau cover assembly 14 includes a fabric cover 16 spanning across the cargo storage compartment 12.

When the fabric cover 16, which is preferably formed of vinyl, is at room temperature, for example, 68–72° Fahrenheit, the fabric cover 16 is perfectly sized to match the dimensions of the cargo area 12. However, as ambient temperatures increase, the fabric cover 16 expands such that it has a length dimension which is greater than the length dimension of the cargo area 12. Conversely, as ambient temperatures decrease, the fabric cover 16 shrinks such that it has a length dimension which is shorter than the length dimension of the cargo area 12. As will be described in greater detail below, the self-adjusting mechanism of the present invention accommodates the expansion and contraction of the fabric cover 16 relative to the cargo area 12. While the dimensions of the fabric cover 12 also change relative to the width direction with temperature variations, these changes are negligible.

Turning now to FIG. 2, the tonneau cover assembly 14 is illustrated in greater detail. The tonneau cover assembly 14 includes a metallic front rail 18 coupled to a plastic first corner piece 20 at one end and a plastic second corner piece 22 at an opposite end. A metallic first side rail 24 is coupled to the first corner piece 20 and a metallic second side rail 26 is coupled to the second corner piece 22.

A first self-adjusting mechanism 28 is coupled to the first side rail 24 opposite the first corner piece 20. A second self-adjusting mechanism 30 is coupled to the second side rail 26 opposite the second corner piece 22. A plastic third corner piece 32 is coupled to the first self-adjusting mechanism 28 and a plastic fourth corner piece 34 is coupled to the second selfadjusting mechanism 30.

A metallic rear rail 36 is coupled between the third corner piece 32 and fourth corner piece 34. The fabric cover 16 is coupled between the front rail 18, first side rail 24, second side rail 26, and rear rail 36. As will be described in greater detail below, the first and second self-adjusting mechanisms 28 and 30 automatically move the rear rail 36 away from the ends of the first side rail 24 and second side rail 26 as the cover 16 expands with temperature increases. Further, the first and second self-adjusting mechanisms 28 and 30 automatically enable the rear rail 36 to move towards the ends of the first side rail 24 and second side rail 26 as the cover 16 contracts with temperature decreases.

Turning now to FIGS. 3 and 4, the first self-adjusting mechanism 28 of FIG. 2 is illustrated in greater detail. While only the first self-adjusting mechanism 28 is illustrated, one skilled in the art will appreciate that the second self-adjusting mechanism 30 of FIG. 2 is substantially identical thereto. The first self-adjusting mechanism 28 includes a stop 38 coupled to the first side rail 24. The stop 38 includes a first v-shaped, preferably metallic, screw boss or wedge 40 frictionally secured within a first channel 42 of the first side rail 24 by a threaded fastener or screw 44. The stop 38 also includes a second v-shaped, preferably metallic, screw boss or wedge 46 frictionally secured within a second channel 48 of the first side rail 24 by a threaded fastener or screw 50.

As can be observed in FIG. 4, threaded fasteners 44 and 50 preferably pass through wedges 40 and 46 to frictionally engage first side rail 24 adjacent first and second channels 42 and 48. However, if desired, apertures may be provided through the first side rail 24 for threadingly receiving the threaded fasteners 44 and 50. Further, other conventional fastening mechanisms, such as rivets, solder or welding may substitute for the threaded fasteners 44 and 50 so long as the stop 38 is prevented from moving relative to the first side rail 24.

The first self-adjusting mechanism 28 also includes a biasing device 52 disposed between the stop 38 and the third corner piece 32. The biasing device 52 includes a first coil spring 54 disposed within the first channel 42 of the first side rail 24 and abuttingly engaging the first wedge 40 and a first leg 56 of the third corner piece 32. The biasing device 52 also includes a second coil spring 58 disposed within the second channel 48 of the first side rail 24 and abuttingly engaging the second wedge 46 and a second leg 60 of the third corner piece 32.

It should be appreciated that other conventional biasing members, such as pneumatic or hydraulic pistons, resilient blocks, or the like may substitute for the coil springs 54 and 58. However, any such biasing member must expand and contract as the third corner piece 32 moves relative to the first side rail 24. Due to their simplicity of use and ease of deposition within the channels 42 and 48, coil springs 54 and 58 are presently preferred.

The first self-adjusting mechanism 28 also includes a generally rectangular, preferably metallic, interconnecting plate 62 coupled to the first side rail 24 and rear rail 36 for accommodating relative movement therebetween. The interconnecting plate 62 is coupled to the stop 38 by means of a threaded fastener or screw 64 engaging the first wedge 40 and a threaded fastener or screw 66 engaging the second wedge 46. As can be observed in FIG. 4, the fasteners 64 and 66 preferably pass through the wedges 40 and 46 to frictionally engage the first side rail 24. However, if desired, the fasteners 40 and 46 may threadingly or abuttingly engage the wedges 40 and 46 so long as the interconnecting plate 62 is prevented from moving relative to the first side rail 24.

If desired, the interconnecting plate 62 may be coupled directly to the first side rail 24 instead of to the stop 38. However, some support member, such as a fastener, should be provided for abuttingly engaging the biasing device 52. Also, it should be appreciated that other conventional fastener mechanisms such as rivets, solder, or welding may substitute for the fasteners 64 and 66.

The interconnecting plate 62 includes a first elongated slot 68 formed therein essentially parallel to the major axis of the first side rail 24. The first slot 68 accommodates the sliding movement of a threaded fastener 70 passing therethrough and coupling the interconnecting plate 62 to the first leg 56 of the third corner piece 32. The interconnecting plate 62 also includes a second elongated slot 72 formed therein essentially parallel to the major axis of the first side rail 24. The second slot 72 accommodates the sliding movement of a threaded fastener 74 passing therethrough and coupling the interconnecting plate 62 to the second leg 60 of the third corner piece 32.

The interconnecting plate 62 is preferably fixed relative to the first side rail 24 and accommodates movement of the rear rail 36 and third corner piece 32 relative thereto as described. However, if desired, the interconnecting plate 62 may be fixed relative to the rear rail 36 and third corner piece 32 and accommodate movement of the first side rail 24 relative thereto. In this case, the location of the slots 68 and 72 would be located adjacent the stop 38. Also, an L-shaped interconnecting plate configuration may be employed instead of the planar interconnecting plate 62 illustrated. An L-shaped configuration would enable the interconnecting plate 62 to be coupled directly to the rear rail 36 instead of the third corner piece 32 as illustrated.

A foam seal 76 is preferably disposed between the third corner piece 32 and the first side rail 24. The foam seal 76 prevents moisture from penetrating into the channels 42 and 48 of the first side rail 24 and damaging the first self-adjusting mechanism 28. Although the foam seal 76 is preferred, other conventional sealing devices may substitute therefore.

Referring now to FIG. 5, the fabric cover 16 must be able to move relative to the first side rail 24 since the first self-adjusting mechanism 28 enables the rear rail 36 (FIG. 3) to move relative to the first side rail 24. To accommodate such movement, the cover 16 is preferably secured to the first side rail 24 by way of a sliding snap assembly 78. Sliding snap assembly includes a male snap member 80 fixedly secured to the cover 16 and a female snap member 82 slidably secured to the first side rail 24. Of course, assemblies such as sliding snap assembly 78 are also employed to interconnect the cover 16 to the second side rail 26 of FIG. 2. Although sliding snap assembly 78 is preferred, one skilled in the art will appreciate that a sliding polymeric bead fixed to cover 16 and removably received within the first side rail 24 may substitute therefore.

Referring now collectively to FIGS. 3, 6 and 7, the operation of the first self-adjusting mechanism 28 will be described. The operation of the second self-adjusting mechanism 30 of FIG. 2 is identical thereto and is thus omitted. When the cover 16 is removed from the first side rail 24 and rear rail 36, the biasing device 52 urges the rear rail 36 away from the first side rail 24. It should be appreciated that the rear rail 36 is not coupled to the rear wall of the pickup truck bed and therefore accommodates such movement. The maximum displacement of the rear rail 36 relative to the first side rail 24 is limited by the engagement of the threaded fasteners 70 and 74 with the interconnecting plate 62 at the end of the first and second slots 68 and 72.

To install the cover 16 onto the first side rail 24 and rear rail 36, the rear rail 36 is urged towards the first side rail 24. The applied force eventually overcomes the bias of biasing device 52 and compresses the first and second coil springs 54 and 58. Assuming that the cover 16 is being installed at room temperature, for example, 68–72° Fahrenheit, the rear rail 36 is placed at least at an intermediate position relative to the first side rail 24 (See FIG. 3). In the intermediate position, the threaded fasteners 70 and 74 are located proximate the mid-point of the first and second slots 68 and 72 of interconnecting plate 62. Once the rear rail 36 is moved to the intermediate position, the cover 16 is secured to the rear rail 36. With the self-adjusting mechanism 28 allowing the rear rail 36 to be positioned in this location, the cover 16 easily snaps onto the rear rail 36. After installation, the tension of the cover 16 maintains the first self-adjusting mechanism 28 at the intermediate position at room temperature.

As can be observed in FIG. 6 as ambient temperatures decrease, cover 16 shrinks along its length dimension. The tension caused by the shrinkage of cover 16 eventually overcomes the bias of biasing device 52 and compresses first and second coil springs 54 and 58. Simultaneously therewith, the rear rail 36 and third corner piece 32 move towards the first side rail 24. To enable such movement, the threaded fasteners 70 and 74 move within the first and second slots 68 and 72 relative to the interconnecting plate 62. Since the maximum amount of shrinkage of the cover 16 at typical ambient temperatures can be calculated, the length dimension of the first and second slots 68 and 72 is preselected to equal or more than accommodate such maximum shrinkage.

As can be observed in FIG. 7, as ambient temperatures increase, cover 16 expands along its length dimension. In response to expansion of cover 16, the biasing device 52 urges the rear rail 36 and third corner piece 32 away from the first side rail 24. As such, the first and second coil springs 54 and 58 force the rear rail 36 away from the first side rail 24. Throughout the movement of the rear rail 36 relative to the first side rail 24, the cover 16 remains taut. Since the maximum amount of expansion of cover 16 at typical ambient temperatures can be calculated, the length dimension of the first and second slots 68 and 72 is preselected to equal or more than accommodate such maximum expansion.

Turning now to FIG. 8, an alternate embodiment corner piece 32a is illustrated. This embodiment is identical to previous embodiments with the exception that the first leg 56a includes an elongated slot 84 and the second leg 60a includes an elongated slot 86 formed therein. The elongated slots 84 and 86 accommodate the sliding movement of the threaded fasteners 70 and 74 passing through the interconnecting plate 62. In this case, the interconnecting plate 62 preferably has the first elongated slot 68 and second elongated slot 72 (See FIG. 3) replaced with threaded apertures 88 and 90.

Thus, a self-tensioning mechanism for tonneau cover assemblies is provided. The self-tensioning mechanism enables automatic movement of the rear rail of a tonneau cover assembly towards the side rails during cover shrinkage with decreasing ambient temperatures. Similarly, the self-adjusting mechanism enables automatic movement of the rear rail away from the side rails during cover expansion with increasing ambient temperatures. Advantageously, the spring rate of the biasing device within the self-tensioning mechanisms of the present invention can be selected to provide more or less resistance to compression and more or less tautness on the cover. Further, the self-tensioning mechanism of the present invention does not require manual intervention to function. Rather, the expansion and compression of the self-tensioning mechanism is automatic. As such, the potential for neglect, misuse, and failure is minimized.

Those skilled in the art can now appreciate from the foregoing description that the broad teachings of the present invention can be implemented in a variety of forms. For example, the self adjusting mechanisms of the present invention may be disposed between the side and front rails of the frame assembly for further accommodating length dimension changes of the tonneau cover. Further, the self-adjusting mechanisms of the present invention may be disposed between each side rail and the front and rear rails to accommodate width dimension changes of the tonneau cover. Therefore, while this invention has been described in connection with particular examples thereof, the true scope of the invention should not be so limited since other modifications will become apparent to the skilled practitioner upon a study of the drawings, specification, and following claims.

What is claimed is:

1. A tonneau cover assembly comprising:
a plurality of rails;
a plurality of corner pieces coupled to said plurality of rails; and
a self-adjusting device interconnecting at least two of said plurality of rails, said self-adjusting device including:
a stop coupled to at least one of said plurality of rails;
a biasing member disposed between said stop and at least one of said plurality of corner pieces; and
an interconnecting plate coupled to said at least one rail and said at least one corner piece and accommodating relative movement therebetween.

2. The assembly of claim 1 wherein said biasing member further comprises a spring.

3. The assembly of claim 1 wherein said interconnecting plate includes a slot for accommodating sliding movement of a fastener passing through said slot and coupling said interconnecting plate to one of said at least one rail and said at least one corner piece.

4. The assembly of claim 1 wherein said interconnecting plate is coupled to said stop.

5. The assembly of claim 1 wherein said interconnecting plate is fixed relative to said at least one rail and accommodates movement of said at least one corner piece relative thereto.

6. The assembly of claim 1 wherein said at least two of said plurality of rails further comprise a side rail and a rear rail.

7. A self-adjusting device for a tonneau cover assembly including a first and second rail interconnected by a corner piece, said self-adjusting device comprising:
a stop coupled to said first rail;
a biasing member disposed between said stop and said corner piece;
an interconnecting plate coupled to said first rail and said corner piece and accommodating relative movement therebetween.

8. The device of claim 7 wherein said biasing member further comprises a coil spring.

9. The device of claim 7 wherein said interconnecting plate includes a slot for accommodating sliding movement of a fastener passing through said slot and interconnecting said plate and said corner piece.

10. The device of claim 7 wherein said interconnecting plate is coupled to said stop.

11. The device of claim 7 wherein said stop further comprises a wedge frictionally secured to said first rail.

12. The device of claim 7 wherein said interconnecting plate is disposed adjacent an outer edge of said first rail.

13. A tonneau cover assembly comprising:
a front rail;
a first corner piece coupled to a first end of said front rail;
a second corner piece coupled to a second end of said front rail;
a first side rail coupled to said first corner piece;
a second side rail coupled to said second corner piece;
a first self-adjusting device coupled to said first side rail opposite said first corner piece, said first self-adjusting device including:
a first stop coupled to said first side rail;
a first spring disposed between said stop and said third corner piece; and
an interconnecting plate coupled to said first stop and to said third corner piece, said interconnecting plate including a slot for accommodating sliding movement of a fastener passing through said slot and coupling said interconnecting plate and said third corner piece;
a second self-adjusting device coupled to said second side rail opposite said second corner piece;
a third corner piece coupled to said first self-adjusting device;
a fourth corner piece coupled to said second self-adjusting device;
a rear rail coupled to said third corner piece and said fourth corner piece; and
a cover removably coupled to said front, first side, second side and rear rails;
wherein said first and second self-adjusting devices automatically move said rear rail away from said first and second side rails as said cover expands with temperature increases, and automatically accommodates said rear rail moving toward said first and second side rails as said cover contracts with temperature decreases.

14. The assembly of claim 13 further comprising:
a second stop coupled to said first side rail; and
a second spring disposed between said second stop and said third corner piece.

15. The assembly of claim 14 wherein said first stop and first spring are disposed within a first channel of said first side rail, and said second stop and second spring are disposed within a second channel of said first side rail.

16. The assembly of claim 13 wherein said second self-adjusting device further comprises:
a first stop coupled to said second side rail;
a first spring disposed between said stop and said fourth corner piece; and
an interconnecting plate coupled to said first stop and to said fourth corner piece, said interconnecting plate including a slot for accommodating sliding movement of a fastener passing through said slot and coupling said interconnecting plate and said fourth corner piece.

17. The assembly of claim 16 further comprising:
a second stop coupled to said second side rail; and
a second spring disposed between said second stop and said fourth corner piece.

18. The assembly of claim 17 wherein said first spring are disposed within a first channel of said second side rail, and said second stop and second spring are disposed within a second channel of said rail.

* * * * *

UNITED STATES PATENT AND TRADEMARK OFFICE
CERTIFICATE OF CORRECTION

PATENT NO.    : 6,293,608 B1                                      Page 1 of 1
DATED         : September 25, 2001
INVENTOR(S)   : Terry D. Dicke et al.

It is certified that error appears in the above-identified patent and that said Letters Patent is hereby corrected as shown below:

Column 1,
Line 10, delete 2nd occurrence of "adjusting"

Column 2,
Line 2, delete "a" and substitute -- an -- therefor
Line 8, "ail" should be -- rail --

Column 5,
Line 16, delete "therefore" and substitute -- therefor --
Line 31, delete "therefore" and substitute -- therefor --

Column 8,
Line 54, after "first" and insert -- stop and first --
Line 57, after "said" and insert -- second side --

Signed and Sealed this

Twenty-fourth Day of December, 2002

JAMES E. ROGAN
*Director of the United States Patent and Trademark Office*